United States Patent Office

3,384,583
Patented May 21, 1968

3,384,583
GREASES
Aleksander Jerzy Groszek, Ealing, London, and Samuel Richard Pethrick, Frimley Green, near Aldershot, England, assignors to The British Petroleum Company Limited, London, England, a corporation of England
No Drawing. Filed Sept. 21, 1966, Ser. No. 580,854
Claims priority, application Great Britain, Sept. 24, 1965, 40,701/65
9 Claims. (Cl. 252—29)

This invention relates to novel lubricating greases and to dispersions with improved lubricating properties.

It is known to incorporate graphite into dispersions and, in combination with other thickeners, into greases. Up to the present it has not been possible to obtain stable dispersions containing more than a small proportion of graphite without the use of surface active agents as stabilisers.

It has now been found that greases can be prepared using graphite alone as thickener and that the amount of thickener necessary is surprisingly low.

It has now been found also that dispersions can be prepared using graphite alone, and that these dispersions are remarkably stable and have improved lubricating properties.

A lubricating composition according to the invention is provided which is based on a mineral or synthetic lubricating base oil and contains an oleophilic graphite as hereinafter defined.

OLEOPHILIC GRAPHITE

The oleophilic graphite used as the thickening agent in the greases or dispersions according to the invention is prepared by grinding natural or synthetic graphite in a low boiling point, low viscosity, low surface tension organic liquid. For convenience, the graphite product prepared in this may will hereinafter be called "oleophilic" graphite to distinguish it from the untreated starting material. "Oleophilic" graphite will adsorb n-dotriacontane in preference to n-butanol in contrast to the untreated starting material. Both natural and syntheic graphite are well-known and readily available. The synthetic material is, for example, produced from petroleum coke by heating to from 1000° to 3000° C. in a vacuum or inert gas. Typically it contains from 95 to 100% wt. carbon. The natural material may have a slightly lower carbon content than this and usually has a larger crystal size.

Satisfactory products can be obtained by grinding in most organic liquids but it is desirable to use one the bulk of which can be easily removed from the oleophilic graphite. Those liquids distilling below 500° C. and having a viscosity below 600 centistokes at 100° F. (38° C.) are therefore preferred. (Liquids having a surface tension below 72 degrees/cm., preferably from 10 to 40 degrees/cm., at 25° C. are preferred.)

Suitable organic liquids are lower molecular weight hydrocarbons, including straight-chain or branched-chain, saturated or unsaturated alkyls, saturated or unsaturated, substituted or unsubstituted, cycloalkyls, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such is isopropyl alcohol. Silicone fluids can also be used.

For best results, the amount of graphite in the graphite/ organic liquid mixture should not exceed 50% wt.; preferably it should be from 2 to 20% wt.

The grinding may be carried out in any suitable grinding mill or device and it is desirable to continue the grinding until an oleophilic graphite having a surface area (as determined by nitrogen adsorption) of from 20 to 800, preferably from 30 to 200, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and graphite. A suitable procedure is to fill the mill with the liquid add half the balls, then the graphite and finally the rest of the balls.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls.

A magnetic filter can be used to remove small steel particles from the slurry. A circulatory system can also be used wherein the slurry is pumped through an external magnetic filter and then returned to the mill.

A suitable vibratory ball mill is sold under the trade name "Megapact," manufactured by Pilamec Limited. The grinding effect is produced by the impact of the balls upon the graphite and upon each other.

The slurry of oleophilic graphite can be separated from the balls by sieving or by displacement by another liquid and sieving.

If a relatively high boiling organic liquid is used for grinding it is preferred to displace this liquid by a low boiling liquid. This liquid can then be removed by boiling. It is preferred to use vigorous boiling.

It is also possible to filter the slurry to obtain a filter cake of oleophilic graphite.

In either case it is preferred to remove the last traces of solvent by heating the filter cake in a vacuum oven for several hours, for example, at 100° C. and at 1 mm. mercury.

Further details regarding the preparation of oleophilic graphite are given in our copending U.S. Application Ser. No. 586,347 filed Sept. 11, 1966.

THE BASE OIL

The lubricating base oil may be a mineral oil or a synthetic oil.

Suitable mineral oils are defined mineral oils obtained from petroleum, for example, those having a viscosity at 210° F. within the range from 2 to 50 centistokes preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols (for example, dioctyl sebacate, dinonyl sebacate, octyl nonyl sebacate, and the corresponding azelates and adipates), liquid diesters of aliphatic dicarboxylic acids and phenols (for example, those described in copending U.S. patent application Ser. No. 382,964, filed July 15, 1964, U.K. patent application 19,687/63, U.S. patent application Ser. No. 400,243 filed Sept. 29, 1964, U.S. patent application Ser. No. 434,094 filed Feb. 19, 1965 and U.K. patent application 31,249/65, and more complex polyesters (for example, those described in U.K. patent specifications 666,697, 743,571, 780,034, 861,962, 933,721, 971,-901 and 986,068 and in U.S. Patent No. 3,321,401, issued May 23, 1967 and U.K. patent application 31,249/65).

THE GREASES ACCORDING TO THE INVENTION

The amount of oleophilic graphite required to thicken the base oil will depend on the nature of the oil and the consistency of grease required. For most purposes an amount up to 50% wt., based on the final grease, will be used. However, it is remarkable that oleophilic graphite can thicken oils to provide greases with very useful properties at concentrations as low as from 10 to 20% wt., based on the final grease, and this is the preferred concentration range.

The oleophilic graphite can be incorporated into a grease by a number of methods. It is preferred to incorporate the oleophilic graphite into a grease, immediately after grinding. However, if the oleophilic graphite is prepared some time before incorporation into the grease, it is preferred to store the oleophilic graphite in an air-tight container to prevent deterioration.

The slurry of ground oleophilic graphite can be converted into a grease by, for example:

(a) The grinding fluid is filtered off. The resulting filter cake is ground by, for example, feeding the take through a colloid mill and stirring the resulting powder into the oil. The resulting grease is finished by colloid milling.

(b) The grinding fluid is boiled off rapidly to avoid the formation of a graphite cake and the resulting powder is stirred into the oil and the grease finished by colloid milling.

(c) Oil is added to the slurry of graphite and the grinding fluid distilled off.

(d) Oil is added to the slurry of graphite and the mixture circulated through a homogeniser (for example, of the Manton-Gaulin type) so that temperatures up to or exceeding 140° C. are produced. The temperature must be high enough to drive off the grinding fluid.

(e) Graphite might also be ground directly in the base oil for the grease. For example, a low surface tension, low boiling point mineral lubricating oil with a viscosity up to 600 centistokes at 100° F. (38° C.) can be used. Elevated temperatures up to 400° C. can be used during the grinding.

Methods (c), (d) and (e) are particularly preferred. In general, the oleophilic graphites can be incorporated into the base oil either at ambient temperatures or, if desired, at elevated temperatures, for example, up to 400° C.

The greases according to the invention have remarkably high Drop Points. When their drop points are measured according to the IP or ASTM standard methods, they are found to be above 400° C.: such greases are described as "infusible" and are difficult to produce by conventional methods. By using carefully selected base oils, for example, synthetic oils with high oxidation and thermal stability, greases having a unique combination of properties can be produced.

It has been found that it is unnecessary to incorporate additives to stabilise the greases according to the invention, for use at temperatures up to 140° C. For use at temperatures above 140° C., antioxidants can be added to the greases according to the invention. In certain circumstances it may be advantageous to add dispersants to the graphite either before grinding or after grinding to oleophilic graphite. In this way the dispersion of the oleophilic graphite may be aided. Viscosity index improvers, metal deactivators, anti-corrosion agents, etc., can also be added to the greases. Load-carrying additives can also be added to the greases according to the invention.

PROPERTIES OF THE GREASES ACCORDING TO THE INVENTION

In general, there are two classes of test method for greases. Firstly there are what might be termed "bench tests." Secondly there are tests in specially designed bearing rigs.

It has been found that the greases according to the invention prepared to NLG1 Grades 0 or 1 (as measured by ASTM Method D217 or IP50) give bearing performances which would be expected from good quality Grade 2 or 3 conventional greases. It has also been observed that, in tests using the ASTM 1092 viscometer, a graphite grease with a worked penetration of 325 (NLG1 Grade 1) gave a flow curve matching a conventional lithium hydroxystearate grease with a worked penetration of 265 (NLG1 Grade 2). Thus, it appears that the rheological properties of the greases according to the invention differ to some extent from conventional greases.

The greases according to the invention have been found to be "infusible," that is, they show no dropping point at temperatures up to 400° C. (using either the IP 31 test or the ASTM Method D566–42). The combination of temperature-stable synthetic base oils, for example, the polyphenyl ethers, with oleophilic graphite has been found to show remarkable high temperature properties.

The greases according to the invention have been tested by the severe SKF 4A rig procedure. In this test a bearing is packed with the grease to be tested and the rig is run for 600 hours with the bearing at a temperature of 120° C. A grease which shows signs of "temperature breakaway" to temperatures above 120° C. or which fails in the bearing before the completion of 600 hours does not pass the test. The bearings are inspected after the test for wear and lacquer deposities. The condition of the grease itself after the test is also inspected.

It was found that the greases according to the invention gave no temperature breakaway during 600 hours and that they remained in excellent condition at the end of the test. The greases showed much less oxidation than is usually found with uninhibited greases. The bearing remained clean and little wear was observed.

It was also found that, when a grease according to the invention was tested according to the Four Ball Test referred to below, improved load-carrying was obtained when compared to conventional lithium soap greases.

DISPERSIONS

Oleophilic graphite can be incorporated into base oils in quantities up to 10% wt., based on the total weight, to form dispersions with surprisingly good lubricating properties. The dispersions are remarkably stable and it is not necessary to add dispersants to stabilise the disperion. However, surface active agents etc. can in some cases be added to the oleophilic graphite either during or after grinding and the ease of dispersion of the oleophilic graphite might, thereby, be increased.

The dispersions can be formed quite simply by stirring the oleophilic graphite into the base oil. Alternatively, a mechanical aid to dispersion such as a colloid mill can be used.

The base oils used for the dispersion are the same as those used for greases and described above.

PROPERTIES OF THE DISPERSIONS ACCORDING TO THE INVENTION

The properties of lubricating dispersions can conveniently be evaluated in the well-known Four Ball EP Lubricant Test Machine. The method of testing as prescribed in U.S. Federal Test Method standard No. 791a Method 6503.1. The load-carrying properties of the dispersions according to the invention are conveniently evaluated by measuring the wear scar diameters on the balls of this machine when lubricated by the dispersions under various loads and after known time intervals.

The load-carrying properties of the dispersions according to the invention are found to be considerably superior to those of suspensions of air-ground graphite.

Dispersions of graphites which have been ground in solvents such as fluorinated or chlorinated hydrocarbons, or solutions of chlorinated hydrocarbons or sulphur containing or phosphorus containing-compounds in hydrocarbons, for example, carbon tetrachloride, have improved load-carrying properties.

The following examples serve to illustrate the invention.

EXAMPLE 1

The effect of the nature of the grinding medium on the thickening power of oleophilic graphite was investigated. The thickening powers were compared by measuring the penetration of the grease. The results are tabulated in Table 1 below:

TABLE I

| Grinding medium (ground for eight hours) | BET surface area of graphite, $m.^2/g.$ | Penetration of grease prepared from 17.5% wt. graphite in BG 150/75, mm.$^{-1}$ | |
|---|---|---|---|
| | | Unworked | Worked |
| Air [1] | 200 | ([2]) | ([2]) |
| n-Pentane | 120 | 294 | 306 |
| n-Hexane | 114 | 287 | 290 |
| n-Heptane | 100 | 272 | 290 |
| n-Octane/n-heptane min | 125 | 287 | 302 |
| 2,2,4-trimethylpentane ("iso-octane") | 111 | 252 | 276 |
| 2,2,5-trimethylhexane | 113 | 252 | 290 |
| Cyclopentane | 88 | 283 | 298 |
| Cyclohexane | 90 | 276 | 290 |
| Ethylcyclohexane | 102 | 264 | 283 |
| Heptene-3 | 67 | 279 | 298 |
| Octene-1 | 81 | 272 | 290 |
| Octene-2 | 73 | 272 | 283 |
| Di-iso-butylene | 48 | 313 | 331 |
| Toluene | 105 | 264 | 290 |
| Benzene | 103 | 287 | 302 |
| Carbon tetrachloride | 87 | 279 | 298 |

[1] Ground for 30 minutes only.
[2] No grease formed.

It can be seen that oleophilic graphites have superior thickening powers to those of air-ground graphite. It can also be seen that the branched hydrocarbons, in particular, iso-octane, provide oleophilic graphites with particularly good thickening powers.

The grinding was carried out in a modified "Megapact" vibratory ball mill, mounted on modified flexible mountings and driven by a more powerful motor than that referred to in Example 2.

EXAMPLE 2

A number of greases according to the invention were prepared using as the thickening agent an oleophilic graphite prepared by grinding a mixture of 15% wt. synthetic graphite and 85% wt. n-heptane in a "Megapact" vibratory ball mill for four hours. The mill used for the grinding was a vibratory ball mill called by the manufacturer (Pilamec Limited) a "Megapact" mill. In the version used in this example the grinding chambers were steel cylinders of 1¼ inch internal diameter by 15 inches long and were nearly filled with ¼ inch diameter steel balls. The mill was fitted with a one-eight horsepower electric motor and the oscillation could be adjusted from 1 to 5 mm. In operation, each cylinder was filled completely with the n-heptane and the steel balls and 25 to 30 grams of graphite were added. This left about 150 to 200 cc. n-heptane in each cylinder. The ends were then sealed with metal caps fitted with rubber washers and the grinding was carried out. After grinding, the contents of the cylinders were placed in sieves which retained the balls and the n-heptane was removed from the oleophilic graphite by rapid evaporation.

The oleophilic graphite product had a BET surface area of 70 square metres/gram as measured by the nitrogen adsorption technique.

The lubricating base oils used for the preparation of the greases were as follows:

(a) A 160/95 grade refined lubricating oil obtained from a Middle East crude petroleum. The grade reference signifies a viscosity of 160 seconds Redwood I (38.9 centistokes) at 140° F. and a viscosity index of 95.

(b) A 50% wt. fraction of a 620/95 grade Middle East lubricating oil obtained by percolating the latter through silica gel and collecting the first 50% wt. to pass through. This fraction contains the more-saurated components which have a high viscosity index.

(c) A commercially available silicone fluid sold under the reference MS 550.

(d) A commercially available polyphenyl ether sold under the reference OS 124 by Monsanto Chemical Company.

(e) Di - o - tert - butylphenyl azelate (prepared as described in our copending U.S. Patent application 434,094 filed Feb. 19, 1965).

(f) Trimethylolpropane tricaprylate.

(g) Dodecyl diphenyl silane.

In all cases the grease was prepared by stirring the oleophilic graphite into the base oil at room temperature followed by passing the mixture through a colloid mill.

The composition and properties of the greases are given in the following table.

TABLE 2

| Greases | 1 | 2 | 3 | 4 | 5 | 6 | 7 | 8 |
|---|---|---|---|---|---|---|---|---|
| Base oil | A | A | B | C | D | E | F | G |
| Oleophilic graphite concentration, percent wt | 25 | 30 | 31 | 25 | 25 | 25 | 33 | 33 |
| Penetration unworked | 307 | 241 | 265 | 248 | 223 | 290 | 230 | 245 |
| (IP 50) 60 strokes mm./10 | 311 | 258 | 248 | 252 | 211 | 290 | 230 | 236 |
| Drop point [1] (IP 31) ° C | I | I | I | I | I | I | I | I |
| Bleeding at 100° C., percent wt | 5.9 | 2.7 | 3.4 | 1.5 | 2.1 | 4.7 | 1.3 | 2.9 |
| Rolling stability test, pen. after 4 hours at— | | | | | | | | |
| RT | | 281 | | 273 | | | | |
| 100° C | | 302 | | 283 | | | | |

[1] The drop points of all greases were determined approximately by means of a thermometer and were found to be above 400° C.

NOTE.—RT=room temperature; I=infusible (i.e., higher than 300° C.).

EXAMPLE 3

Greases according to the invention containing from 10 to 20% wt., based on the weight of grease, were prepared from oleophilic graphite. The graphite was prepared by milling synthetic graphite in the grinding fluid for eight hours. In each case the graphite was separated from the grinding fluid by boiling off the grinding fluid rapidly, stirring the dry powder into the oil, and finishing the grease by colloid milling. The grease consistencies were from Grade 1 to 3 as measured on the NLG1 scale.

The surface areas of the oleophilic graphites used are tabulated in Table 3 below:

TABLE 3

| Graphite reference | Solvent used for grinding | Time of grinding in hours | Surface area, m.$^2$/g. |
|---|---|---|---|
| A | Straight-run benzine | 8 | 85 |
| B | Cyclohexane | 8 | 90 |
| C | n-Heptane | 8 | 97 |
| D | do | 8 | 100 |
| E | do | 8 | 100 |
| F | Iso-octane | 8 | 111 |
| G | do | 8 | 116 |

The "bench" and rig properties of greases prepared using oleophilic graphites as described in Table 3 are given in Table 4.

Greases according to the invention containing from 10 to 20% wt., based on the weight of grease, were prepared from oleophilic graphite. The oleophilic graphites were dispersed in a mineral lubricating base oil, BG 160/95, which had a Redwood I viscosity at 140° F. (60° C.) of 160 seconds and a viscosity index of 95. The results are tabulated in Table 5.

TABLE 5

| Grinding medium | Wear scar diameters for 5% wt. dispersions of oleophilic graphite in BG 160/95 in mm. | | | |
|---|---|---|---|---|
| | 100 kg./1 min. | 150 kg./1 min. | 200 kg./1 min. | 15 kg./60 min. |
| BG 160/95 | 2.50 | Weld | Weld | 0.75 |
| Air [1] (1 hour) | 2.46 | 2.68 | do | |
| n-Heptane [1] (2 hours) | 1.85 | 2.35 | 2.75 | 0.78 |
| n-Heptane [2] (8 hours) | 2.85 | 2.74 | Weld | 0.78 |
| Octene-1 [2] (8 hours) | 3.32 | 2.84 | do | 0.78 |
| Toluene [2] (8 hours) | 2.52 | 2.60 | do | 0.82 |
| Carbon tetrachloride [2] (8 hours) | 2.18 | 2.44 | do | 0.80 |

[1] Both graphite had BET surface areas of 70 m.$^2$/g.
[2] These graphites were dispersed in a BG 160/95 base oil from a different crude source.

TABLE 4

| Grease reference No. | Graphite reference | Graphite content of grease, percent weight | Oil used | Penetration unworked | Penetration worked | Bleed (DTD 825) percent weight | Drop point | SKF 4A bearing test | Hoffman high speed test | Hoffman hot 100° (C.) test |
|---|---|---|---|---|---|---|---|---|---|---|
| 1 | F | 17.5 | BG 150/75 | 252 | 276 | | | I | | |
| 2 | E | 17.5 | BG 150/75 | 272 | 290 | | | I | | |
| 3 | B | 17.5 | BG 150/75 | 276 | 290 | | | I | | |
| 4 | C | 16.7 | BG 150/75 | 279 | 294 | 6.3 | | I | Very good, pass [1] | |
| 5 | F | 18.0 | BG 150/75 | 294 | 317 | | | I | Good stability and clean lines [2] | Good, pass. Good, pass. |
| 6 [3] | G | 15.0 | BG 150/75 | 330 | 348 | | | I | Pass, good cleanliness | |
| 7 [3] | A | 14.5 | BG 150/75 | 343 | 362 | | | I | | |
| 8 | D | 16.7 | Polyphenyl ether (OS124) | 219 | 234 | 1.1 | | I | | |
| 9 | D | 13.3 | do | 309 | 335 | 5.4 | | I | | |
| 10 | D | 16.7 | Silicone oil (MS710) | 234 | 248 | 1.4 | | I | | |

[1] After testing in the SKF (Skefko) 4A rig the grease had an unworked micro penetration of 245 and a worked micro penetration of 272. The bleed (DTD 825) was 6.3% weight.
[2] A very clean bearing was obtained. A small amount of wear was produced, probably by a content of metal particles produced in ball milling the oleophilic graphite.
[3] Greases G and A were prepared by adding the base oil to the slurry of oleophilic graphite and grinding fluid and distilling off the grinding fluid.

It can be clearly seen from the table that the greases according to the invention are directly competitive with the high temperature soap-thickened greases, for example, the lithium hydroxystearate greases, in terms of hardness and stability in high temperature bearings. In the case of drop point the greases according to the invention are superior to such soap-thickened greases.

It was also found that grease Reference No. 5 had superior load-carrying properties (as measured by the Four Ball Machine) as compared with a lithium hydroxystearate grease. Grease 5 had a Mean Hertz Load of 44 kg. and a Welding Load of 282 kg., whereas the soap grease (designated LS2) had a Mean Hertz Load of 26 kg. and a Welding Load of 158 kg.

EXAMPLE 4

The load carrying properties of dispersions of oleophilic graphite, prepared by grinding in a number of different grinding fluids, were examined using a Four Ball Machine. The oleophilic graphites were dispersed in a mineral lubricating base oil, BG 160/95, which had a Redwood I viscosity at 140° F. (60° C.) of 160 seconds and a viscosity index of 95. The results are tabulated in Table 5.

If comparisons are drawn between dispersions of graphites in base oils from the same sources, several conclusions can be drawn. Firstly, graphite ground in n-heptane gives dispersions with load-carrying properties superior to dispersions of air-ground graphites. Secondly (as can be seen from the lower half of the table), dispersions of oleophilic graphites which have been ground in carbon tetrachloride have particularly favourable load-carrying properties.

We claim:

1. A lubricating composition which is based on a lubricating base oil containing in an effective amount an oleophilic graphite having a surface area of from 20 to 800 square metres per gram and prepared by grinding natural or synthetic graphite in organic liquid distilling below 500° C., having a viscosity below 600 centistokes at 38° C. and having a surface tension below 72 degrees/cm. at 25° C.

2. A composition as claimed in claim 1, which comprises up to 50% by weight, based on the total composition, of said oleophilic graphite.

3. A composition as claimed in claim 1, which comprises from 10 to 20% by weight, based on the total composition, of said oleophilic graphite.

4. A composition as claimed in claim 1, wherein the lubricating oil is a mineral base lubricating oil.

5. A composition as claimed in claim 1, wherein the lubricating oil is a synthetic lubricating base oil.

6. A lubricating composition as claimed in claim 1, in which the organic grinding liquid is selected from the group consisting of n-heptane, octene-2,2,2,4-trimethylpentane, cyclohexane, benzene, toluene, carbon tetrachloride and isopropyl alcohol.

7. A lubricating composition as claimed in claim 1, in which the amount of graphite present in the graphite/organic liquid mixture during grinding is 2 to 20% wt.

8. A method of preparing a lubricating composition comprising forming a mixture which consists of less than 50% by weight of natural or synthetic graphite and an organic liquid distilling below 500° C., having a viscosity below 600 centistokes at 38° C. and having a surface tension below 72 degrees/cm. at 25° C., grinding the graphite in the organic liquid until the graphite becomes oleophilic and has a surface area of 20–800 square meters per gram, separating the oleophilic graphite from the organic liquid, stirring an effective amount of the oleophilic graphite into a lubricating base oil, and finishing the resultant composition by colloid milling.

9. A method of preparing a lubricating composition comprising forming a mixture which consists of less than 50% by weight of natural or synthetic graphite and a lubricating base oil distilling below 500° C., having a viscosity below 600 centistokes at 38° C. and having a surface tension below 72 degrees/cm. at 25° C., and grinding the graphite in the lubricating base oil until the graphite becomes oleophilic and has a surface area of 20–800 square meters per gram.

References Cited

UNITED STATES PATENTS

| | | | |
|---|---|---|---|
| 3,059,769 | 10/1962 | Frost | 252—25 |
| 3,338,822 | 8/1967 | Groszek | 252—25 |

DANIEL E. WYMAN, *Primary Examiner.*

I. VAUGHN, *Assistant Examiner.*